United States Patent [19]

Parker

[11] Patent Number: 4,834,410
[45] Date of Patent: May 30, 1989

[54] BICYCLE PAIRING APPARATUS

[76] Inventor: Bruce H. Parker, 26038 Charing Cross Rd., Valencia, Calif. 91355

[21] Appl. No.: 50,629

[22] Filed: May 14, 1987

[51] Int. Cl.⁴ .............................................. B62K 13/06
[52] U.S. Cl. ................................... 280/209; 280/231; 297/248
[58] Field of Search ............... 280/209, 202, 231, 232, 280/273; 297/248, 249; 272/73

[56] References Cited

U.S. PATENT DOCUMENTS

| 3,865,401 | 2/1975 | Kingsly | 280/209 |
| 3,938,827 | 2/1976 | Johnson | 280/209 |
| 4,290,620 | 9/1981 | Chika | 280/209 |

FOREIGN PATENT DOCUMENTS

| 20403 | 7/1915 | Denmark | 280/209 |
| 628479 | 10/1927 | France | 280/202 |
| 87125 | 11/1920 | Switzerland | 280/202 |
| 22552 | of 1913 | United Kingdom | 280/202 |

Primary Examiner—Charles A. Marmor
Assistant Examiner—Tamara L. Finlay
Attorney, Agent, or Firm—Louis J. Bachand

[57] ABSTRACT

A bicycle pairing apparatus comprising a plastic chassis having head, rear and intermediate portions respectively opposed to the handlebars, the rear axles and the seat posts of the bicycles. Connector rods connecting the bicycles at the handlebars, the rear axle and the seat post pass through the chassis portions and are supported by the chassis in such manner that loadings on the bicycles that might put them out of square to each other are resiliently resisted and the bicycles are kept in square alignment.

29 Claims, 2 Drawing Sheets

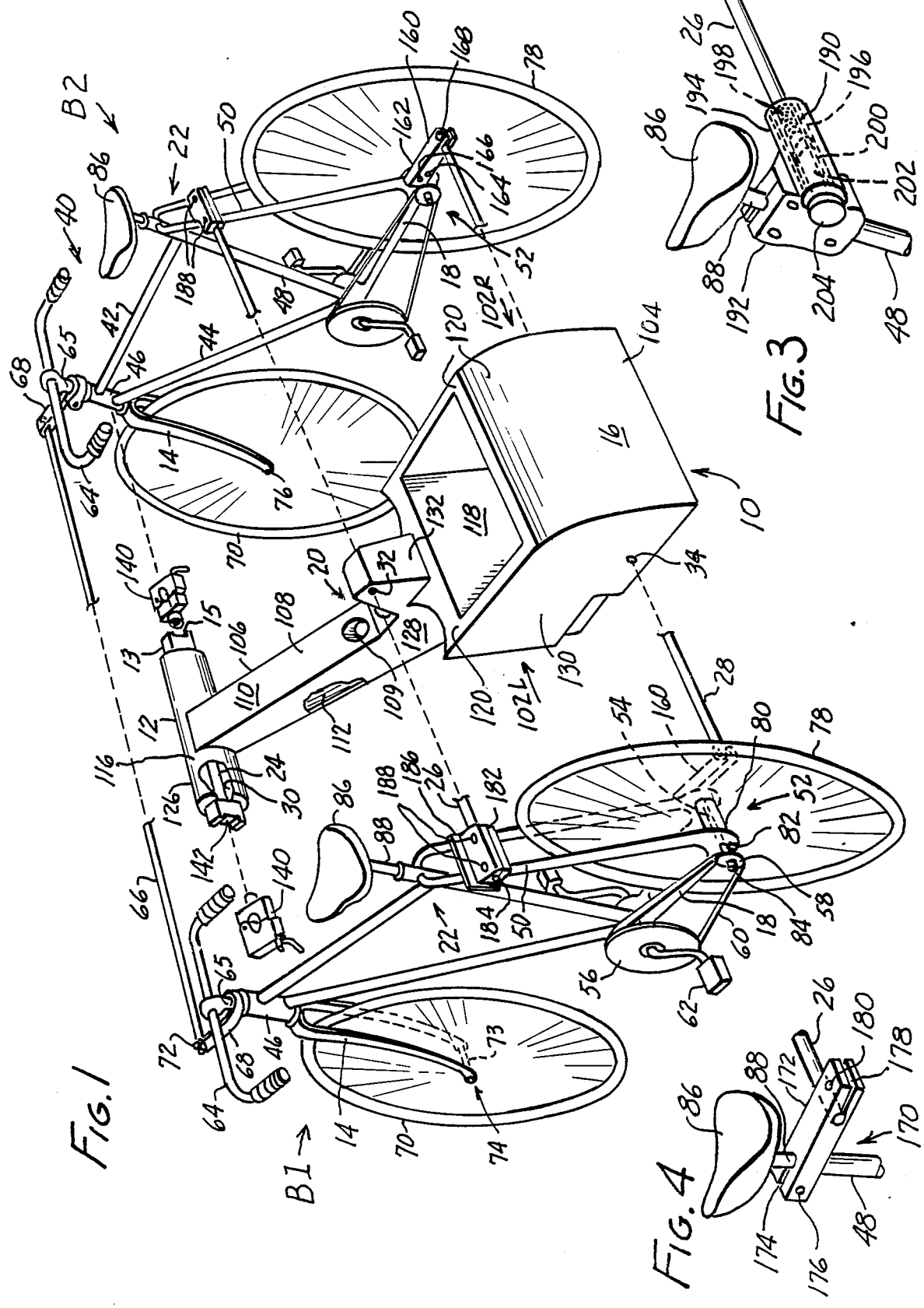

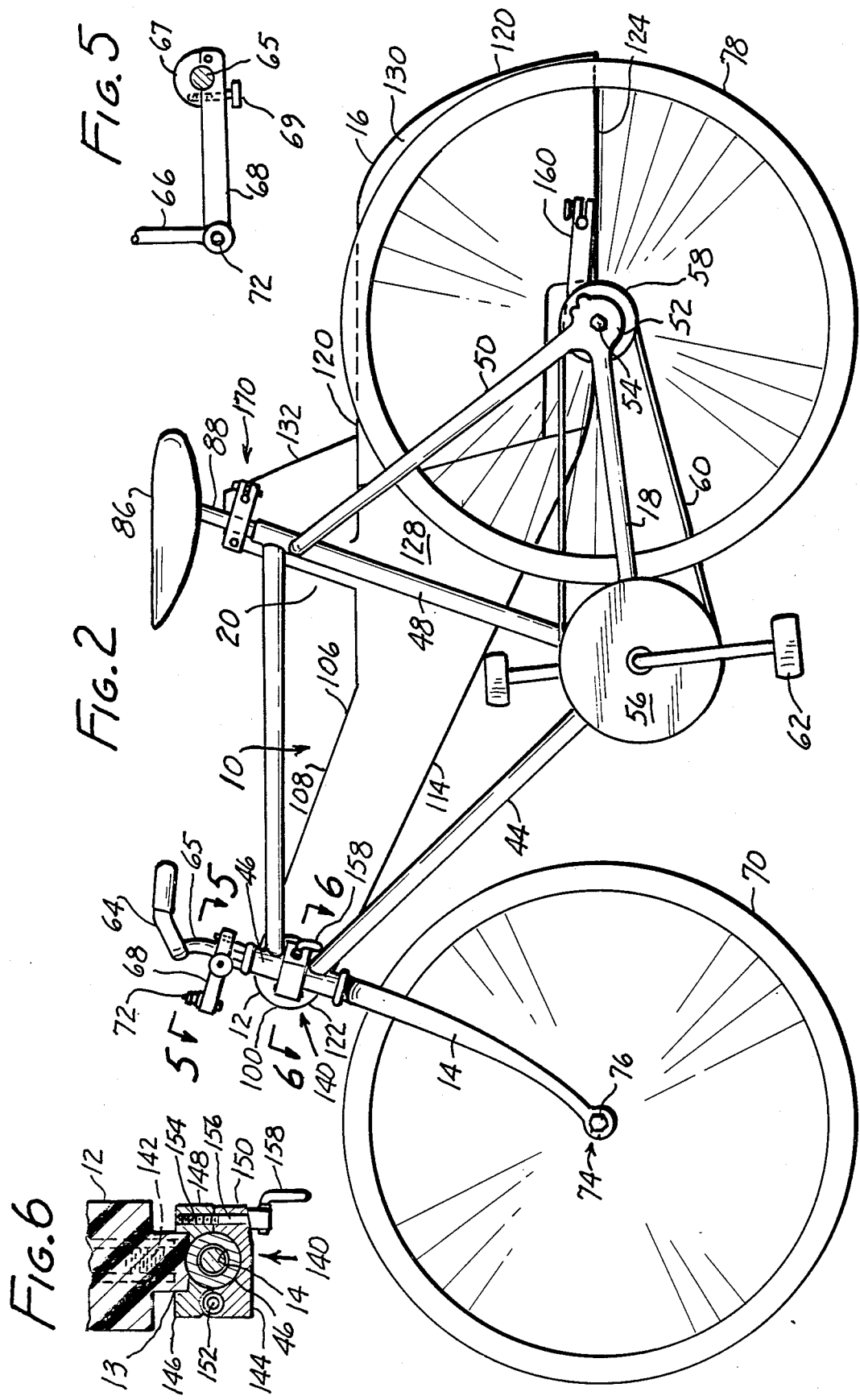

BICYCLE PAIRING APPARATUS

TECHNICAL FIELD

This invention has to do with enhancing the fun and health benefits inherent in bicycle riding, by making convenient and practical the increased sociability found in side-by-side riding, while having the safety of four wheel stability and the power of two riders pedaling.

More particularly, the invention relates to a bicycle pairing apparatus which for the first time practically couples together two bicycles side-by-side in square and kept square alignment. Specifically, the invention provides a center chassis for a pair of bicycles which temporarily locally deflects under misaligning loads on the bicycles but returns under memory to thereby keep the bicycles in square alignment.

BACKGROUND

A pair of bicycles can become out of square in numerous ways. Ideally the bicycles stand in parallel vertical planes, but in practice the bicycle planes may toe in at front or rear, or either or both may be tipped in or out, or aspects of each of these problems may exist simultaneously. In use the bicycles are separately subject to loads, e.g. a speed bump or pot-hole, and this will apply torquing forces to the paired bicycles, or one bicycle may strike an object such as a curb, and the other not, their momentum producing a racking force which tries to carry one bike ahead farther than the other. And all these forces may be encountered in random combinations. The result is that previous attempts to have paired side-by-side, rather than tandem front to back, seat bicycles have not proved successful.

Tandem technology has been developed as an extension of basic bicycle frame technology and is well established, but for social riding tandem bicycles necessarily have the riders shouting into the wind in an effort to communicate. Mounting of two seats, two sets of pedals, and doubled handlebars on a single person frame has been attempted, but the result is unstable, dangerous, and at a minimum ungainly, See U.S. Pat. No. 4,178,008 to Barrett.

Various bracket combinations have been applied to side-by-side bicycles, See U.S. Pat. No. 1,522,039 to Swearinger, U.S. Pat. No. 3,350,115 to Ferrary, U.S. Pat. No. 3,870,338 to Holub, and U.S. Pat. No. 4,288,089 to Thiessen. But the vigor, randomness and variety of uneven loads has defied solution until the present invention wherein a stiff but not brittle chassis is used to control the positioning and force response of connector rods, enabling the bicycles to remain squarely aligned front-to-back, top-to-bottom and corner-to-corner in both a horizontal and a diagonal plane relative to the ground, despite the wear and tear of real world use.

SUMMARY OF THE INVENTION

It is accordingly an object of the present invention to make available side-by-side bicycle riding, using presently available bicycles. Another object is to provide bicycle pairing apparatus whereby paired bicycles remain in square alignment. Another object is to join bicycles by connector rods and to buttress the rods against racking, pivoting, yawing, pitching and rolling forces on either or both bicycles, and to do so resiliently by absorbing these forces in a high flexural strength chassis of low flexural modulus plastic, such that the bicycles remain or are returned to perfectly square alignment for use. It is yet another object to provide a cuboidal chassis for coupling a pair of bicycles together through connector rods arranged prismoidally in the chassis, the prismoid longitudinal axis being normal to the long axis of the cuboidal chassis. Still another object is to provide the stability and security of a four-wheel vehicle for older riders, by pairing ordinary two-wheel bicycles, while providing the sociability of a surrey for riders of all ages, for single seat and tandem bicycles as well.

These and like and other objects to become apparent hereinafter are realized in accordance with the invention in a bicycle pairing apparatus for maintaining in square alignment a pair of side-by-side bicycles having coordinated steering, comprising a cuboidal chassis having spaced, rigidly interconnected left and right side walls, upper and lower walls, and front and rear end walls, the chassis being rigidly side wall-coupled to the bicycles at their front wheel forks, rear wheel forks and seat mounts, whereby the rigidly interconnected walls block relative shifting of the bicycles bodily out of square alignment.

In this and like embodiments: the chassis side wall-couplings are triangularly arranged on the side walls; the triangular arrangements have a longest side, the chassis walls defining a locus, the triangle longest side lying with the locus; the chassis comprises a unitary body of low flexural modulus synthetic organic plastic; the chassis is interiorly hollow; the plastic body is rotationally molded; there is further included separately formed connectors coupling the chassis side walls and the bicycles; the connectors comprise plural, prismoidally arranged connector rods extending between the chassis side walls and the bicycles, and fasteners securing the connector rods to the bicycles in coupling defining relation; the connector rods continue from the bicycles through the chassis for fastening by the fasteners in bicycle pair connecting relation; the chassis side walls define a series of normally horizontal, parallel, rigid walled bores respectively opposite the front forks, the rear forks and the seat mounts of the bicycles, the bores closely receiving the connector rods in their the prismoidal relation, whereby relative bodily shifting of the bicycles is blocked by chassis resistance to relative movement of the bores or the connector rods therein; the chassis comprises low flexural modulus synthetic organic plastic; the plastic is cross-linked polyethylene; the chassis is a unitary, interiorly hollow rotational molding of cross-linked polythelene; the chassis sides are locally relieved for passing a rider's legs alongside; the chassis defines a head portion adapted to oppose the bicycles' front forks, a rear portion adapted to oppose the bicycles' rear forks, and an intermediate portion adapted to oppose the bicycles' seat mounts, the locally relieved sides defining a cross-dimensionally reduced chassis portion extending diagonally relative to the ground between the head portion and the rear portion; the head portion is defined within the wall planes of the cuboidal chassis and has a central bore adapted to slidably receive a connector rod extending between the front forks of the bicycles; the rear portion is generally rectangular cuboid defined within the wall planes of the cuboidal chassis and has a bore adapted to slidably receive a connector rod extending between the rear forks of the bicycles; there is further included an upwardly opening recess in the rear portion above the rear portion bore; the intermediate portion is an elongated cuboid defined within the walls of the cuboidal chassis, the intermediate portion having a bore adapted to slidably receive a connector rod extending between the seat mounts of the bicycles; and the chassis side wall is locally reinforced around each of the bores.

In another embodiment bicycle pairing apparatus is provided including connector rods and fasteners defining coupling means between the chassis side walls and the bicycles, the fasteners including front fork fasteners comprising a split ring adapted to lock about each the front fork, the ring and rod defining cooperating means for the interconnection thereof in length adjustable relation; the cooperating interconnection means comprise adjustably engageable means on the ring and the opposing terminus of the connector rod; the chassis defines a head portion having a connector rod receiving bore, and including also shoulder means formed on the head portion flanking the bore, and cooperating shoulder means on the ring, whereby the ring and head portion interlock against rotation of the ring relative to the head portion in the secured condition of the connector rod and the fastener; the fasteners include rear fork fasteners comprising a split end bracket securely mounted to each the rear fork, and a rear portion connector rod adapted to interfit with the bracket split portion in length adjustable, locking relation; each bracket extends rearwardly from the rear axle of its bicycle, whereby the chassis rear portion connector rod is positioned aft of the bicycle rear axle; the fasteners include seat mount fasteners comprising a seat mount bracket secured to each the bicyle frame below the bicycle seat, the seat mount bracket comprising means to length adjustably secure the intermediate portion connector rod to the bicycle below the seat; the seat mount bracket comprises a split saddle secured to the bicycle rear wheel stays, the saddle having a split bore into which the intermediate portion connector rod is length adjustably receivable, and there is included also adjustable means for fastening the rods in the saddle bore; or the seat mount bracket comprises a clamp having a first split bore adapted to receive the bicycle seat post in locking relation, and a second split bore disposed transversely to the first bore into which an intermediate portion connector rod is length adjustably receivable, and including also adjustable means for fastening the rod in the second split bore; or the seat mount bracket comprises a tubular element and means wedging said connector rod into said tubular element.

In a particularly preferred embodiment, bicycle pairing apparatus is provided comprising a rigid cuboidal chassis having opposed side walls bored to receive rigid connector rods passing therethrough for connection to a pair of side-by-side bicycles in a prismoidal relation whose long axis lies normal to the long axis of said cuboidal chassis and corresponding to square alignment of the bicycles, the chassis being rigid against the received rods shifting from the prismoidal relation thereby to maintain square alignment of the bicycles against out-of-square inducing loads received by the bicycles in use.

In this and like embodiments, the chassis comprises a first bore defining head, a second bore defining intermediate portion in a tee relationship with the head, and a third bore defining rear portion also in tee relationship with the intermediate portion, the chassis maintaining the rods within the bores in prismoidal relation.

In yet another embodiment there is provided a bicycle pairing apparatus, comprising a rigid cuboidal chassis having opposed side walls and rigid connector rods passing therethrough for connection to a pair of commonly steered side-by-side bicycles in a prismoidal relation corresponding to top-to-bottom, front-to-rear, and corner-to-corner horizontal and diagonal square alignment of the bicycles, the chassis being rigid against the received rods shifting from the prismoidal relation thereby to maintain the square alignment of the bicycles against out-of-square inducing loads applied to the bicycles in use.

Another embodiment comprises a center chassis assembly for pairing bicycles having opposed rigid frames carrying left and right hand front wheel forks, interconnected steering handles, rear wheel forks, and seat mount means intermediate the front and rear wheel forks, the chassis assembly comprising a chassis having a low flexural modulus synthetic organic plastic body with upper and lower horizontally extended walls and left and right hand vertically extended side walls joining the upper and lower walls to define a box-like locus, and plural parallel connector rods connecting the respective front forks, rear forks and seat mount means, the chassis journaling the connector rods in triangulated relation such that the longest side of the triangle is within the locus.

The invention further provides the foregoing apparatus in combination with a pair of bicycles.

In its method aspects the invention contemplates the method of maintaining aligned a pair of bicycles in side-by-side disposition including interconnecting the bicycles with rigid parallel rods at a plurality of opposed, spaced, triangularly related locations, and bracing the rods against relative bodily shifting by interposing a low flexural modulus plastic chassis therebetween, to keep the rods parallel and the bicycles thereby aligned.

THE DRAWING

The invention will be further described in conjunction with the attached drawing in which:

FIG. 1 is a perspective view of the apparatus;

FIG. 2 is a side elevation view thereof;

FIG. 3 is a fragmentary detail perspective view of the seat mount connection;

FIG. 4 is a view like FIG. 3 of another form of the seat mount connection;

FIG. 5 is a fragmentary detail plan view of the steering connection, taken on line 5—5 in FIG. 2; and, FIG. 6 is a fragmentary detail view in section of the front form connection, taken on line 6—6 in FIG. 2.

PREFERRED MODES

As will be evident from the description of the invention thus far, a chassis of tough, i.e. low flexural modulus plastic is employed to brace connector rods against their misalignment, and the three-dimensional squareness of the paired bicycles is thus maintained. Essentially, the chassis is a structure defining a beam against each of the various forces that the chassis is likely to encounter. The spaced parallel walls are rigidly connected with the result that forces on one or another wall are resisted not merely by the wall immediately subjected to the load but by the opposing wall as well via the intermediate, normal walls providing a rigidity against deflection which is tempered by the inherent flex in the plastic and in the body cuboidal shape into which the plastic is formed. There is accordingly a stiffness and simultaneous springiness which accommodates transitory shifting out of parallel planes between the connector rods, but which to the extent of the shift-inducing force exerts a reciprocal corrective urging to restore parallel positioning of the rods by a resilient return of the force which has been accumulated in the plastic chassis body as a result of the initial deflection. "Square alignment" herein refers to coplanarity of the bicycles in vertical planes as paired, and identity in length of intersecting diagonals drawn between diagonally opposed corners of any horizontal plane which includes both bicycles, i.e. in square alignment the bicycles are vertically upright, not tilted toward or away from each other, equidistantly spaced at front and rear from a common longitudinal axis extending centrally through the chassis, and centered on a common transverse axis normal to the longitudinal axis.

With reference now to the drawing in detail, in FIG. 1 a pair of conventional bicycles B1, B2 (the invention is not limited to any particular bicycle or even of necessity matching bicycles) are set up in parallel vertical planes as shown. The bicycle pairing chassis 10 is disposed between the bicycles B1, B2, with its head 12 opposite the front forks 14 of the bicycles, its rear portion 16 opposite the rear forks 18 of the bicycles, and its mid-portion 20 opposite the seat mounts 22 of the bicycles. Connector rods 24, 26 and 28 extend respectively between bicycles B1, B2 through bore 30 in head 12, bore 32 in chassis mid-portion 20, and bore 34 in chassis rear portion 16, respectively.

Bicycles B1, B2 are conventional in construction which is a singular advantage of the present apparatus. It is not necessary to buy new, specially made bicycles. Bicycles B1, B2 each comprise a frame 40, shaped from a cross-bar 42, a diagonal bar 44 connected at a common neck 46, and at a seat post 48 to define a closed figure as shown. Integrally formed with the frame 40 proper is the rear fork 18 and rear stays 50 which meet at a common junction 52 where the rear axle 54 is held. A pair of sprockets 56, 58 drive chain 60 responsive to cranking of the pedals 62 in the usual manner. It is noteworthy that the bicycles B1 and B2 when paired by the chassis 10 are independently operable so that a single rider can operate them, as though the unoccupied bicycle were a side car.

Steering is effected through conventional handlebars 64 linked together by a bar 66 through oppositely divergent arms 68, through the relative angular adjustment of which parallel paths are defined for the front wheels 70 during turns, as is known, cf. U.S. Pat. No. 3,350,115 noted above. The mode of connection of the bar 66 to the arms 68 is a pin connector 72 which permits free pivoting of the bar and arms relative to each other. The arms 68 in turn are clamped to the handlebar gooseneck 65, by hinge 67 held closed by screw 69.

The front wheels 70 have hubs 71 journaled on axles 73 held in slots 74 defined by the front forks 14 and secured by conventional nuts 76. Rear wheels 78 have hubs 80 through which axles 54 extend held in slots 82 defined by the common junction 52 and secured by nuts 84.

The bicycles have seats 86 surmounting risers 88 journaled for axial adjustment in seat posts 48. The area of the bicycles B1, B2 defined by the risers 88, the upper reaches of the seat post 48 and the upper reaches of the rear stays 50 are herein collectively referred to as the seat mounts 22 of the bicycles in connection with the attachment of the connector rod 26 thereat, for as will be seen (FIGS. 1, 3, and 4) the actual location of the securement of the connector rod 26 to the bicycles can be varied from the seat post 48, the riser 88, or the rear stays 50. Similarly the other connector rods 24, 28 can be located variously at the front and rear portions of the bicycles B1, B2 in areas herein generally referred to front wheel forks and rear wheel forks, by which is meant any portion of the forks 14, 18 or rigid assemblies therewith, e.g. the common neck 46 journaling front fork 14, or continuations thereof e.g. the junction 52 of the rear forks 18 and the stays 52 such that attachment there has the result of rigidly coupling the bicycles together.

The chassis 10 is formed of a suitable material for the purpose, and specifically preferred is medium to high density, e.g. 0.935–0.95 density polyethylene resin, which has been highly cross-linked, e.g. above 90% crosslinked. This material per se exhibits a relatively low flexural modulus of about 60,000 to 80,000 psi. and typically has an elongation of 300 to 500% and preferably 400%. It is accordingly extremely tough in the sense of being able to resist initially and ultimately to recover from deflections imposed on it. By contrast the chassis has a very high flexural strength, owing to its box-like configuration which gives X-beam reinforcement against variously applied forces, whereby the apparatus is resistant to non-parallelling of the coupled bicycles, but flexibly so in the sense that the chassis material itself will yield momentarily.

A convenient method for forming this material is rotational molding in which a powdered form of the resin containing a crosslinking agent is tumbled against heated walls where it fuses into a predetermined shape, here the shape of chassis 10. Rotational molding is advantageous in providing an interiorly hollow chassis 10, for reduced material and shipping cost. Blow molding of the chassis 10 can also be used as can other plastic forming techniques albeit less advantageously. The chassis 10 is a cuboid, i.e. a solid figure having six sides each of which is a generally rectangular. For purposes of economy in manufacture through the use of less resin and for esthetic and use reasons as well, the cuboidal shape herein is sculpted to eliminate unnecessary material, while preserving the six sides as a frame of reference for the chassis walls. Further, the chassis may be regarded as an integrated series of cuboidal forms i.e. the head 12, the mid-portion 20 and the rear portion 16 all have cuboidal aspects.

With reference to FIGS. 1 and 2, the chassis 10 is seen to have the head 12 which has a front wall 100, gently rounded for esthetic reasons but which may be considered to be in tangency with the theoretical plane of the cuboid front wall, left and right side walls 102L and 102R respectively, and rear wall 104 terminating rear portion 16 of the chassis. The cuboidal relation is maintained in the sculpted chassis 10 by preserving the right angled intersection of the walls, 100, 102R, 102L and 104 which coupled with the rigidity of these walls creates the stiffly responsive mentioned beam effect when one of the walls is moved relative to its opposite wall.

The mid-portion 20 of the chassis 10 comprises an elongated member 106 of essentially box-like configuration which extends from the chassis head 12 to the chassis rear portion 16. In the elongated member 106, the top wall 108 (with beverage holding hole 109) defines the mid-section of the chassis upper wall 110, and the lower wall 112 thereof the mid-section of the chassis lower wall 114. The chassis upper wall 110 further includes the top 116 of the head 12 and the dished (to form a receptacle 118) upper surface of the top 120 of rear portion 16. Chassis lower wall 114 includes as well as wall 112 of the chassis mid-section member 106, contiguous, integrally formed wall surfaces 122 on the bottom of head 12 and wall surfaces 124 on the bottom of rear portion 16. The side walls 102L, 102R are similarly defined by corresponding side wall surfaces e.g. 126, 128 and 130 on the head 12, the member 106 and the rear portion 16, respectively, as shown.

A boss 132 is defined on the chassis upper wall 110 for purposes of supporting the bore 34 at an appropriate height without undue use of material.

Having described then the bicycles B1, B2 and the chassis 10, we turn now to the connection of the bicycles in such manner that the bicycles are maintained square by the chassis. The connection of the bicycles B1, B2 is by means of the connector rods 24, 26, 28 as noted above. Prescinding for the moment from the fastening of these connectors which can be by divers means, it is to be stressed that the several connector rods are rigid, preferably tubular structures, for light weight and strength, which are arranged in a prismoidal pattern, i.e. with a rectangular base and sloped sides, and specifically with the longitudinal axis of the prismoid lying normal to the longitudinal axis of the chassis 10, i.e. transverse to the travel direction of the bicycles B1, B2. What results is a structure of "extraordinary" strength from the complementary cooperative interaction of two rigid, but cross-directed structures, the cuboid and the prismoid. Because one is integrated with the other, no angle of stress, no peculiar torque can bodily displace any portion of the chassis structure without being met by huge resistive forces which damp and absorb the stresses and torques like a torsion bar. It will be noted that the triangle of the rods 24, 26 and 28 as defined in the side wall 102L and 102R has a longest side between front connector rod 24 and rear connector rod 28, and opposite connector rod 26. In keeping with the invention this triangle's longest side lies within the chassis within the locus defined by the chassis member 106, specifically, for strength in the final assembly.

The triangular arrangement of the connector rods 24, 26 and 28 and their close journaling in their respective bores 30, 32, and 34 blocks relative movement of the rods except through the elongation or compression of the chassis 10 portions lying between the relatively moving rods. Because the cuboidal chassis 10 is through configuration rigid and made preferably of a rigid plastic the distortion of the chassis portion 106 for example, (brought about by the deflection of the rods relative to each other, as by one bicycle hitting a curb, which would cause a racking response in the paired bicycles as the rods 24, 26 went out of parallel), is negligible.

Accordingly, the chassis 10 serves to maintain the rods 24, 26 and 28 parallel in their respective parallel bores 30, 32, 34 defined by the chassis. Systems merely bracing the paired bicycles with rod elements, without bracing the rod elements with a tough chassis are prone to failure since the elements must absorb all the load and do so rigidly rather than resiliently as can be accomplished with the tough plastic chassis of the invention herein.

The connector rods are suitably fastened to the paired bicycles, with convenience in attachment and detachment, adjustability, cost and esthetics all playing a role. The drawings illustrate presently preferred forms of fastening, it being recalled that the main criterion is security of connection. For connecting rod 24 extending through the head 12, it is preferred to the fastener structure 140 shown best in FIG. 6. For purposes of the form of fastener 140 shown in FIG. 6, the connector rod 24 is threaded on its exposed ends 142. The fastener 140 comprises a split metal ring 144 having squared shoulders 146 and opposed halves 148, 150, joined at one side by hinge pin 152, and defining a threaded bore 154 at the opposite side. A bolt 156 having a cam handle 158 is used to close the split ring 144, by tightening the bolt and then cinching with the cam handle. In use, the fastener 140 is threaded onto the end 142 of the rod 24 inserted in chassis head 12 more or less to a rod net length adjusting predetermined amount so that the bicycles B1,B2 when paired across the chassis 10 will be appropriately spaced to accommodate the riders. In this connection, the relief of the theoretical cuboidal chassis laterally outboard of the chassis portion 106, provides a comfortable amount of leg room for two riders. The fastener 140 is then placed around the front fork 14 by clamping it about the neck 46 encircling the upper stem (not shown) of the front fork, by threading bolt into the fastener and locking with cam handle 158. The same operation is repeated on both sides of the chassis 10. Other forms of front rod fastening can also be used. The head 12 is preferably provided with squared ends 13 which define notches 15 to receive snugly the fasteners 140 in shoulder to shoulder engagement, see FIG. 1.

The rearwardmost rod 28 extending through bore 34 in the rear portion 16 of the chassis 10 is preferably held to the bicycles B1, B2 by rearwardly extending brackets 160 which are bolted to an ear 162 at the bicycle frame junction 52 by bolts 164, 166, the brackets being split to receive the rod 28 ends, and provided with a set screw 168 to lock the rod and bracket together. The length of the rod 28 between the fasteners 140 is adjusted relative to the front connector 24 length so as to keep the bicycles B1, B2 square to each other. Other forms of rear rod 28 fastening can also be used.

The intermediate connector rod 26 passes through the bore 32 in boss 132 and is connected at the seat mount 20 as mentioned. In the embodiment shown in FIGS. 2 and 4, the fastener 170 comprises an elongated, generally rectangular bracket 172 having a fore-split bore 174 which is vertically extended to receive in clamping relation by tightening of bolt 176 the seat stem 88, and a rear-split bore 178 which is horizontally extended to receive in clamping relation by tightening of bolt 180 the intermediate connector rod 26. In this manner the bicycles B1, B2 can be joined amidships, the length of the rod 26 between the fasteners 170 being such as will maintain the bicycles in vertical planes, taking into account the adjustment made in the attachment of the front and rear connector rods 24, 28.

Alternatively, in the embodiment shown in FIG. 1, the intermediate connector rod 26 may be connected to the bicycles B1, B2 by a saddle 182 which defines a split bore 184, the saddle being seated on the rear stays 50, secured by a face plate 186 bolted to saddle across the rear stays, as shown. The connector rod 26 is held in adjusted condition in the saddle bore 184 by locking down bolts 188 which reduce the diameter of the bore 184.

In another embodiment, depicted in FIG. 3, the intermediate rod 26 is secured by the use of a cammed shaft 190. In this embodiment, a bracket 192 is bolted to the seat post 48 as shown, the bracket defining a horizontally disposed tubular element 194. Within the tubular element 194 a wedging means is disposed in the form of a first plug 196 having a central bore 198, this plug being thread-connected to the intermediate rod 26, and to bolt 202. A second plug 200 is loosely carried on the bolt 202, the bolt being rotatable by cap 204. Plugs 196, 200 have opposed slanted faces so that tightening the bolt 202 draws the plugs into face engagement, the slanted faces causing the plugs to misalign and wedge against the tubular element 194, locking the intermediate rod in its adjustment.

As will be evident from the foregoing, the mentioned objectives have been achieved: Ordinary bicycles are converted into a four-wheel, stable, doubly powered vehicle by the facile addition of a series of prismoidally arranged rods seated in a centrally disposed cuboidal chassis which absorbs and controls relative bodily shifting of the rods induced by forces on the bicycles to which they are attached.

I claim:

1. Bicycle pairing apparatus for maintaining in square alignment a pair of side-by-side bicycles having coordinated steering, comprising a chassis having spaced, rigidly interconnected left and right side walls, upper and lower walls, and front and rear end walls, defining a closed volume, said chassis defining a head portion adapted to oppose said bicycles' front forks, a rear portion adapted to oppose said bicycles' rear forks, and an intermediate portion adapted to oppose said bicycles' seat mounts, said chassis side defining a cross-dimensionally reduced chassis portion extending diagonally relative to the ground between said head portion and said rear portion for passing a rider's legs alongside, said chassis head, rear, and intermediate rear portions being adapted to be rigidly side wall-coupled by unitary connecting means to both said bicycles at their front wheel forks, rear wheel forks and seat mounts respectively, whereby said rigidly interconnected walls block relative shifting of said bicycles bodily out of square alignment.

2. Bicycle pairing apparatus according to claim 1, in which said side wall-couplings are triangularly arranged on said side walls.

3. Bicycle pairing apparatus according to claim 2, in which said triangular arrangements have a longest side, said chassis walls defining a locus, said triangle longest side lying within said locus.

4. Bicycle pairing chassis according to claim 1, in which said chassis comprises a unitary body of low flexural modulus synthetic organic plastic.

5. Bicycle pairing apparatus according to claim 1, in which said chassis closed volume is interiorly hollow.

6. Bicycle pairing chassis according to claim 1, in which said plastic body is rotationally molded.

7. Bicycle pairing apparatus according to claim 1, in which said unitary connecting means comprise separable connectors coupling said chassis side walls and said bicycles.

8. Bicycle pairing apparatus according to claim 7, in which said connectors comprise plural, prismoidally arranged connector rods extending between said chassis side walls and said bicycles, and fasteners securing said connector rods to said bicycles in coupling defining relation.

9. Bicycle pairing apparatus according to claim 8, in which said connector rods continue from said bicycles through said chassis for fastening by said fasteners in bicycle pair connecting relation.

10. Bicycle pairing apparatus according to claim 1, in which said head portion is defined with the wall planes of said chassis and has a central bore adapted to slidably receive a connector rod extending between the front forks of said bicycles.

11. Bicycle pairing apparatus according to claim 10 in which said rear portion is generally rectangular cuboid defined within the wall planes of said chassis and has a bore adapted to slidably receive a connector rod extending between the rear forks of said bicycles.

12. Bicycle pairing apparatus according to claim 11, including also an upwardly opening recess in said rear portion above said rear portion bore.

13. Bicycle pairing apparatus according to claim 11, in which said intermediate portion is an elongated cuboid defined within the walls of said chassis, said intermediate portion having a bore adapted to slidably receive a connector rod extending between the seat mounts of said bicycles.

14. Bicycle pairing apparatus according to claim 13, in which said chassis side wall is locally reinforced around each of said bores.

15. In combination with a pair of bicycles, the bicycle pairing apparatus according to claim 1, in which said unitary connecting means comprise connector rods and fasteners defining coupling means between said chassis side walls and said bicycles, said fasteners including front fork fasteners comprising a split ring adapted to lock about each said front fork, said ring and rod defining cooperating means for the interconnection thereof in length adjustable relation.

16. Bicycle pairing apparatus according to claim 15, in which said cooperating interconnection means comprise adjustably engageable means on said ring and said connector rod.

17. Bicycle pairing apparatus according to claim 16, in which said chassis head portion has a connector rod receiving bore, and including also shoulder means formed on said head portion flanking said bore, and cooperating shoulder means on said ring, whereby said ring and head portion interlock against rotation of said ring relative to said head portion in the secured condition of said connector rod and said fastener.

18. Bicycle pairing apparatus according to claim 15, in which said fasteners include rear fork fasteners comprising a split end bracket securely mounted to each said rear fork, and a rear portion connector rod adapted to interfit with said bracket split portion in length adjustable, locking relation.

19. Bicycle pairing apparatus according to claim 18, in which each said bracket extends rearwardly from the rear axle of its said bicycle, whereby said chassis rear portion connector rod is positioned aft of said bicycle rear axle.

20. Bicycle pairing apparatus according to claim 15, in which said fasteners include seat mount fasteners comprising a seat mount bracket secured to each said bicycle frame below the bicycle seat, said seat mount bracket comprising means to length adjustably secure said intermediate portion connector rod to said bicycle below said seat.

21. Bicycle pairing apparatus according to claim 20, in which said seat mount bracket comprises a split saddle secured to the bicycle rear wheel stays, said saddle having a split bore into which said intermediate portion connector rod is length adjustably receivable, and including also adjustable means for fastening said rod in said saddle bore.

22. Bicycle pairing apparatus according to claim 20, in which said seat mount bracket comprises a clamp having a first split bore adapted to receive the bicycle seat post in locking relation, and a second split bore disposed transversely to said first bore into which an intermediate portion connector rod is length adjustably receivable, and including also adjustable means for fastening said rod in said second split bore.

23. Bicycle pairing apparatus according to claim 20, in which said seat mount bracket comprises a tubular element and means wedging said connector into said element.

24. The apparatus claimed in claim 1, in combination with a pair of bicycles.

25. Bicycle pairing apparatus for maintaining in square alinement a pair of side-by-side bicycles having coordinated steering, comprising a chassis having spaced, rigidly interconnected left and right side walls, upper and lower walls, and front and rear end walls, said chassis being adapted to be rigidly side wall-coupled to said bicycles at their front wheel forks, rear wheel forks and seat mounts, separable connectors coupling said chassis side walls and said bicycles, said connectors comprising plural, prismoidally arranged connector rods extending through said chassis and from said chassis side walls to said bicycles, and fasteners securing said connector rods to said bicycles in coupling defining relation, said chassis side walls defining a series of normally horizontal, parallel, rigid wall bores respectively opposite said front forks, said rear forks and said seat mounts of said bicycles, said bores closely receiving said connector rods in their said prismoidal relation, whereby relative bodily shifting of said bicycles out of square alignment is blocked by chassis resistance to relative movement of said bores or said connector rods therein.

26. Bicycle apparatus according to claim 25, in which said chassis comprises low flexural modulus synthetic organic plastic.

27. Bicycle pairing apparatus according to claim 26, in which said plastic is cross-linked polyethylene.

28. Bicycle pairing apparatus according to claim 26, in which said chassis is a unitary, interiorly hollow rotational molding of cross-linked polythelene.

29. The apparatus claimed in claim 25, in combination with a pair of bicycles.

* * * * *